FIF 9310 OR RE 14,576
DRAFTSMAN
M. BROCK.
LASTING MACHINE.
APPLICATION FILED MAY 6, 1918.
Reissued Dec. 24, 1918.
1,188,616
RE 14,576.
4 SHEETS-SHEET 1.
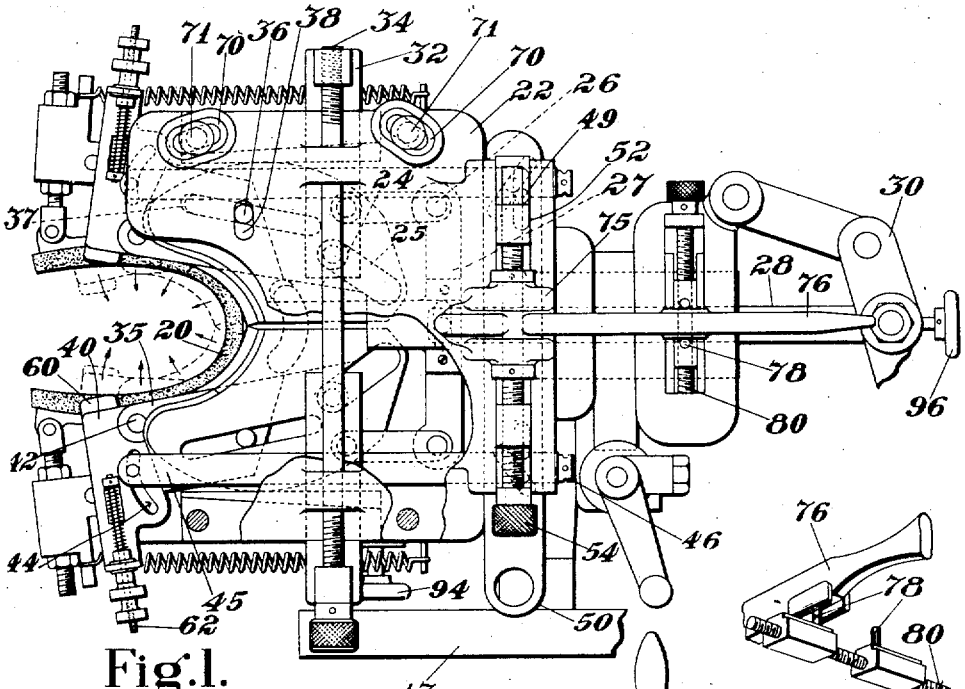
Fig. 1.
Fig. 8.
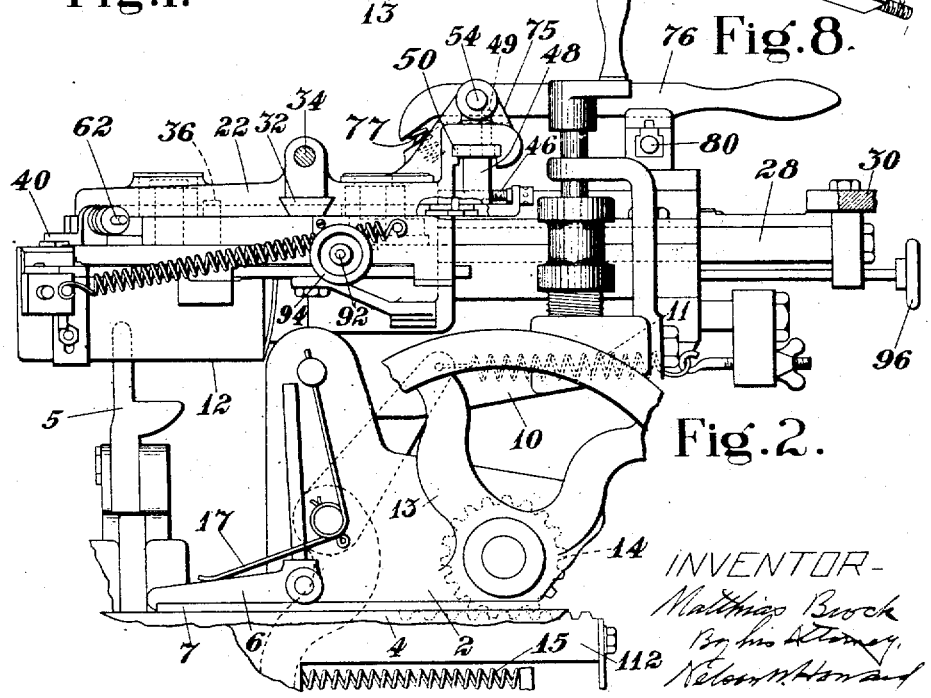
Fig. 2.
INVENTOR-
Matthias Brock
By his Attorney,
Nelson M. Howard
THE NORRIS PETERS CO., PHOTO-LITHO., WASHINGTON, D. C.

M. BROCK.
LASTING MACHINE.
APPLICATION FILED MAY 6, 1918.

Reissued Dec. 24, 1918. 14,576.

4 SHEETS—SHEET 2.

INVENTOR-
Matthias Brock
By his Attorney,
Nelson W. Howard

THE NORRIS PETERS CO. PHOTO-LITHO., WASHINGTON, D. C.

M. BROCK.
LASTING MACHINE.
APPLICATION FILED MAY 6, 1918.
Reissued Dec. 24, 1918.
14,576.
4 SHEETS—SHEET 3.
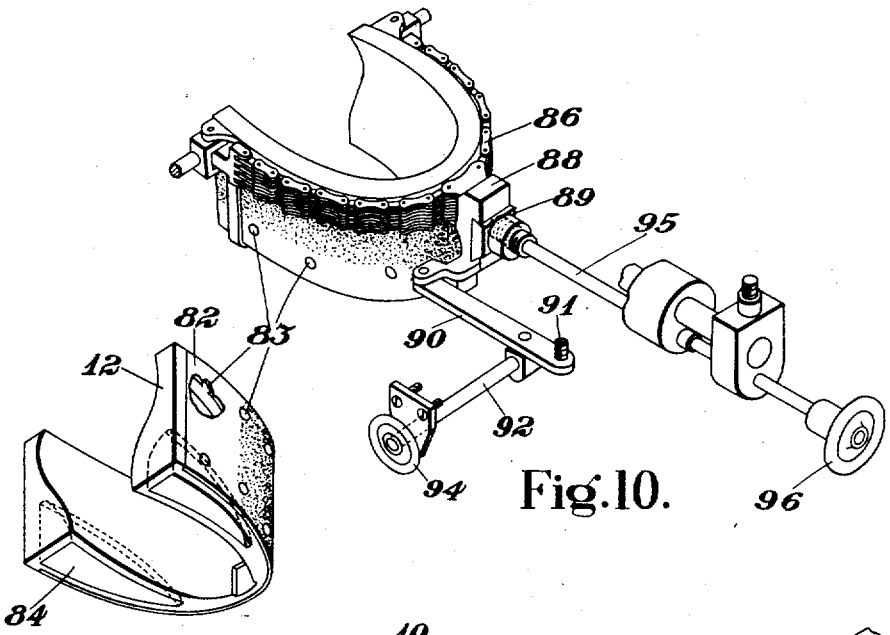
Fig.10.
Fig.9.
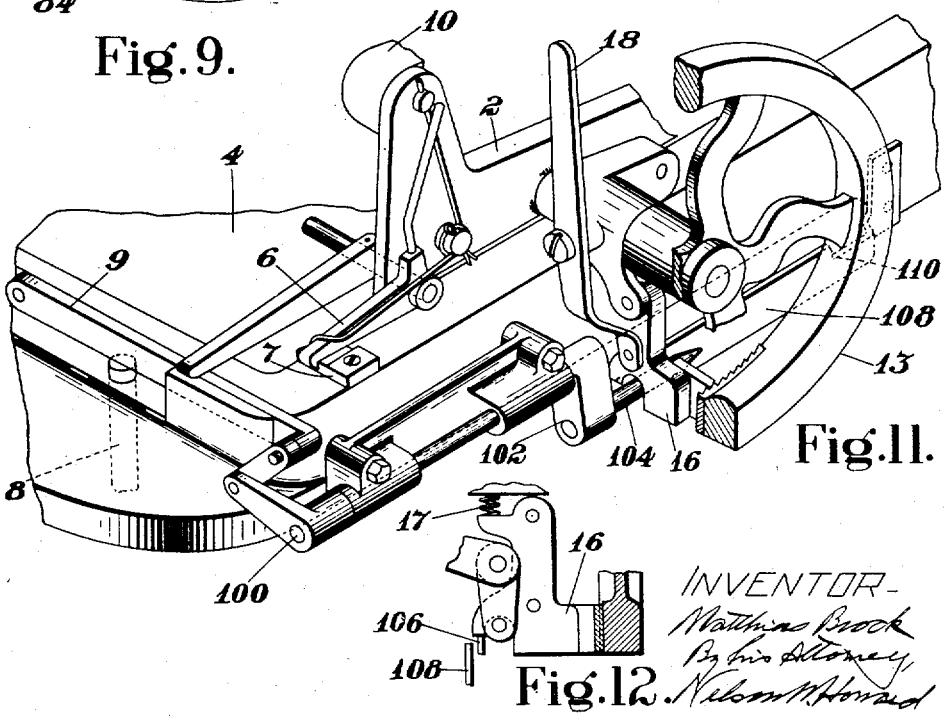
Fig.11.
Fig.12.
INVENTOR-
Matthias Brock
By his Attorney
Nelson M. Howard
THE HORNS PETERS CO., PHOTO-LITHO., WASHINGTON, D. C.

M. BROCK.

LASTING MACHINE.

APPLICATION FILED MAY 6, 1918.

Reissued Dec. 24, 1918.

14,576.

4 SHEETS—SHEET 4.

INVENTOR-
Matthias Brock
By his Attorney,
Nelson W. Howard

THE NORRIS PETERS CO. PHOTO-LITHO. WASHINGTON, D. C.

UNITED STATES PATENT OFFICE.

MATTHIAS BROCK, OF BOSTON, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

LASTING-MACHINE.

14,576. Specification of Reissued Letters Patent. Reissued Dec. 24, 1918.

Original No. 1,188,616, dated June 27, 1916, Serial No. 706,655, filed June 29, 1912. Application for reissue filed May 6, 1918. Serial No. 232,968.

*To all whom it may concern:*

Be it known that I, MATTHIAS BROCK, a citizen of the United States, and resident of Boston, in the county of Suffolk and State of Massachusetts, have invented new and useful Improvements in Lasting-Machines, of which the following is a specification.

This invention relates to lasting machines, and has for one of its main objects to improve end lasting mechanisms.

An important feature of this invention consists in provision for relative angular adjustment of the heel wipers and the heel embracing band to adapt each of said instrumentalities to the contour of the portion of the last particularly acted upon by each.

In modern lasts the contour of a right or a left last in the plane of the heel seat is substantially different from the contour of the same last in a plane one half or three quarters of an inch below the heel seat. This difference is largely produced by under cutting the inner side of each last to produce a narrow shank. The wipers have to deal with the heel seat contour and the band with the lower contour. In the illustrated embodiment of this feature of the invention the adjustment is shown as produced by moving the wipers, together with their actuating mechanism, about a center located near the rear end of the heel whereby the wipers may be swung inwardly over the inner side of a right or the inner side of a left heel seat.

Another important feature of this invention consists in improved end lasting wipers and operating mechanism therefor. In the illustrated embodiment of this feature of the invention each portion of the wipers moves inwardly over the shoe bottom in a direction substantially perpendicular to the adjacent portion of the shoe edge, and only in that direction. This is to be distinguished from a wiper the closing and advancing movement of which carries it lengthwise of the shoe edge on the side of the shoe in order that it may close over the end of the shoe. The desired object is herein shown as secured by forming each of a pair of end embracing wipers in a plurality of relatively movable sections. As shown a rear end section of a heel wiper has the usual closing and advancing movement appropriate for the curved end of the heel; a second section has a closing movement only without advancing; and a third section has a closing and a backwardly turning movement to adapt it to the incurve at the front of the heel and at the shank. Preferably this backwardly turning movement is variable for different shapes of lasts, as, for example, in its starting and finishing points.

A further feature of this invention consists in novel means for shaping the end portions of the heel stiffener flange which are to be included in the inseam that connects the welt and upper to the innersole lip of a welt shoe. The stitches of the inseam require to be located close down to the base of the lip and these portions of the heel stiffener material tend to bridge from the edge of the innersole to the top of the lip and offer substantial difficulty in sewing the end portions of the inseam. The pressure of usual wipers or lasting plates is insufficient to shape this stiff material. I have, therefore, in accordance with the illustrated embodiment of this feature of the invention provided special stiffener end shapers for this purpose which automatically shape the stiffener ends during the lasting operation. These shapers may be advantageously set into the lower face of the end sections of the wipers and normally are projected inwardly therefrom yieldingly so that they engage the stock in advance of the wipers when the wipers are closed and so that, in partaking of the turning movement of the end sections of the wipers, they rub edgewise and crease the stock with yielding pressure against the base of the innersole lip.

Still another feature of the invention consists in means constructed and arranged to prevent relative lengthwise movement of the shoe and toe rest until the toe supporting pressure of the toe rest against the shoe toe has been relieved so that a shoe, particularly a high toed shoe, may be freed from the toe rest without objectionably scraping the shoe toe.

The improvements herein described are applicable to the machine shown in my Patent No. 1,018,477 to which reference may be had for fuller drawings and description of previously known portions of the machine.

These and other features of the invention, including combinations of parts, provisions for adjustments and more important details of construction will now be described in connection with the drawings and then pointed out in the claims, except the improvements in methods of making uppers herein disclosed which is claimed in my co-pending application, Serial No. 62,041, filed Nov. 17, 1915.

Figure 1 is a top plan view of a heel lasting mechanism embodying this invention, the cap plate being partially broken away, and arrows being applied to indicate the directions of movement of the respective sections of the new wipers;

Fig. 2 is a side elevation of what is shown in Fig. 1;

Fig. 8 is a detail of an adjuster;

Fig. 9 is a perspective view of the novel heel band;

Fig. 10 shows the means for adjusting the rear end of the heel band transversely of the machine and the means for adjusting the band lengthwise in the machine;

Fig. 11 shows the combination of elements organized to cause the toe supporting pressure of the toe rest to be relieved before relative lengthwise movement of the toe rest and shoe occurs;

Fig. 12 is a detail showing the hand wheel lock controller of Fig. 11 in front elevation.

Figure 3:
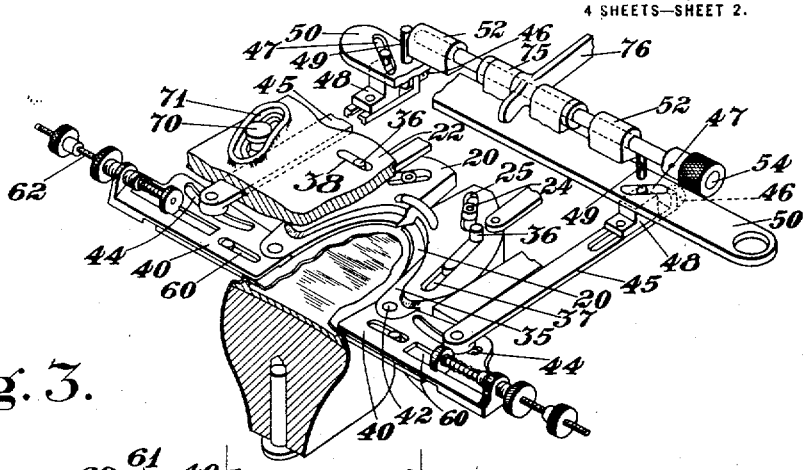
Fig. 3 is a perspective view to disclose details.

The heel lasting carriage 2 is movable forwardly over the frame 4 to clamp, endwise, the shoe carried by the heel post 5 and is locked by a latch 6. The head 10 supports the heel embracing band 12 and all these parts are or may be constructed and actuated substantially as in my prior United States patent excepting as hereinafter pointed out.

The wipers, which are guided over a supporting face on the head 10 and confined by a cover plate 22, are each formed in a plurality of sections all of which have an operating connection through the rear sections 20 which are joined by a tongue 21. These sections have guide slots 25, Figs. 3 and 5, for studs 24, and through links 26 are jointed to a cross bar 27 on the front end of a plunger 28 actuated by a hand lever 30, Fig. 1.

Figure 5:
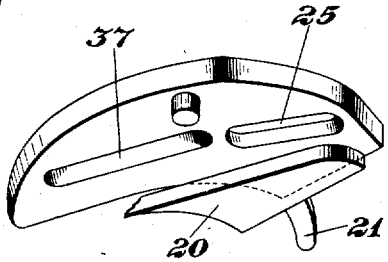
Fig. 5 shows the lower side of the rear section of one of the wipers.

The sections 20 are confined edgewise by edge walls on head 10 as may be seen in Fig. 1 to have a combined advancing and inwardly closing operative movement, and the studs 24 are mounted on separate slides 32 by which, and the right and left threaded rod 34, the sections 20, and through them the other sections of the wipers, can be adjusted to open more or less for wide and narrow shoes. Each section 20, see Fig. 5, is cut away on its lower side to receive the middle section 35 which partakes of the closing movement of section 30 but is restrained from advancing movement relatively to the shoe. This is accomplished by providing on the upper face of section 35 an elongated projection, Fig. 6, which fits into the slot 37 in section 20 to compel the turning movement. The projection has on its upper face a pivot stud 36 which stands in a transverse slot in cap plate 22, Fig. 1. These connections cause sections 20 and 35 respectively to close over the heel seat in directions substantially perpendicular to portions of the last edge adjacent to them.

The end sections 40 of the wipers are each pivoted at 42 to the front end portion of the section 35 and therefore have no forward movement. Instead thereof each end section has a cam slot 44 in which stands a stud on the front end of a lateral stationary bar 45 so that said section is compelled to swing rearwardly when the wipers close, as indicated by the arrows, Fig. 1. This makes its direction of closing about perpendicular to the adjacent portion of the last edge in the region of the heel breast line and causes it to tend to gather backward over the heel seat stock which usual constructions of wipers push forwardly into the shank.

The bars 45 carry adjustably by screws 46, Figs. 1, 2, and 3, on their rear portions blocks 48 having upstanding studs reaching into slots 47 in an adjusting bar 50. The slots are inclined in reverse directions so that endwise movement of the bar 50 will advance one bar 45 and retract the other bar to adjust wiper end sections 40 oppositely about pivots 42 for the curve of the portion of the right or a left shoe to be acted upon by them. Adjustment of end sections 40 separately for more or less curvature can be made by the screws 46. The movement of adjusting slide 50 can be limited for the style of last being operated upon by studs 49 and stop blocks 52 which are adjustable by right and left threads on a rod 54.

Figure 4:
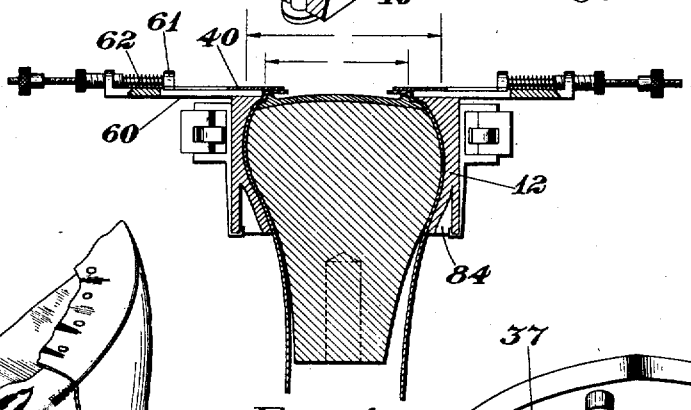
Fig. 4 is a section showing the action of the stiffener end shapers carried by the wipers.
Figure 6:
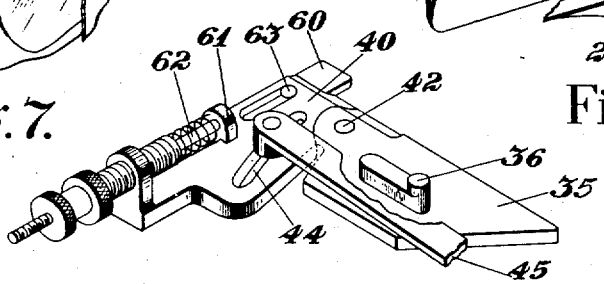
Fig. 6 shows the front section of one of the wipers and the stiffener end shaper carried on it.

Each end section 40 is cut away on its lower side to receive, flush, the stiffener end shaper 60, Figs. 3, 4, 6, which has a lug 61 projecting up through a slot in wiper section 40. This lug has a narrow neck, as has also a second stud 63, by which necks the shaper is supported to slide beneath the section 40. A spring pressed plunger 62 holds the shaper normally projected in advance of the wiper as in Fig. 1, and permits it to yield back of the wiper's edge as in Figs. 3 and 4 so that, after making early engagement with the work, the shaper will press the upper and end portion of the stiffener into lasted position in the angle between the feather edge and rib or shoulder of a welt innersole. Then, while continuing the pressure, the shaper will rub edgewise as it partakes of the movement of wiper section 40 about pivot 42. This rubbing movement is for the purpose of permanently shaping the stock as in Fig. 7. The shaper may retire under the wiper section 40, and the wiper fold the stock over the innersole lip, as in Fig. 4, before the lug 61 reaches the limit of its movement relatively to section 40 and exerts a final unyielding inward pressure.

The cap plate 22 has slots 70 curved about a common axis located near the rear end of the heel band and said plate, together with the wipers, is thereby made adjustable about said center relatively to the heel band to adapt the wipers to the contour of the tread face of the last as distinguished from the contour which the heel band must fit. The wipers are free to accompany the cap plate in this adjustment, the cross bar 27 being slotted for this purpose, and are compelled to do so by the studs 36. The cap has an arm 75, being the support for adjusting slide 50, in which is pivoted on rod 54 the adjusting lever 76 and a spring 77 under the front end of the lever holds its handle end down to engage one or another of two stop pins 78, Fig. 8, or, it may be, in confinement between the two pins. By swinging the lever and engaging it over one pin the wipers will be adjusted relatively to the heel band for a right shoe and when it is engaged over the other pin they will be adjusted for a left shoe of the same pair of shoes. The pins are carried on blocks which are adjustable simultaneously in reverse directions by a screw rod 80. When the lever 75 is centered between the pins the wipers will be symmetrical with the heel band. The cap plate is confined by headed stud screws 71 which permit the sliding adjustment provided by the slots 70.

The heel band 12 is preferably made as shown in Figs. 4, 9 and 10. The body portion of the band consists of a composition of balata-gum and leather fibers or shreds which can be molded by a moderate degree of heat that is insufficient to injure the leather fibers or the leather backing 82 with which the band is shown as provided. The inner face of the band which is unlined, takes a hard glassy surface under the heavy molding pressure. This glassy face is retained through the life of the band and enables it to be used on colored upper leathers, such as russet stock without producing the discoloration which results from the friction of a leather band upon colored uppers. This is perhaps due in part to the fact that the composition band conforms to the shape of the last so that its pressure is more fully distributed than is that of a leather band and also in part to the fact that the glassy surface of the balata band grips, or adheres to, the leather of the shoe upper with a non-slipping engagement greatly in excess of that of a leather band. In practice, this characteristic is utilized in several ways. For example, the band, which is highly resilient and does not lose its resiliency as does a leather band, preferably is initially formed a little narrower than the average width of the shoe heels so that as the shoe and the band are moved relatively, the one into the other, for jacking the shoe the band grips the upper at the corners, between the end and side faces, of the last and tensions is forward tightly around the rear end of the last. Also it has been discovered that in the use of this band the tack which is put into the rear end face of the shoe in the assembling operation, to hold the upper materials from displacement relatively to the heel portion of the last during the pulling-over operation and the lasting operations, can be withdrawn before the lasting operation if this heel band is used. This is because this band grips and holds the upper so securely that it prevents the stock from being drawn up between the band and the last by the inward wiping action of the lasting plates or wipers upon the heel seat. This is a great advantage because heretofore the life of a heel band has been largely determined by the extent of abrasion of the band by this heel end tack.

The leather protective covering 82 is preferably molded upon the band and has perforations through which the composition is pressed to form integral studs 83 connecting the band to the covering, said studs being headed more or less on the outside of the covering as an incident to the molding operation and forming a secure connection of the covering to the band. The band may have a vertically straight outer face which with the inner face, molded to conform to the contour of the last, forms a thick wall at the lower portions of the ends of the band, as is best shown in Fig. 9. These thick walls are preferably chambered out as at 84 to reduce the weight of the band and to add to the resiliency of the end portions of the band. Preferably the band is shaped with the lower portions of its sides abnormally close together relatively to the upper portions so that when the band is closed about the last by the usual band end operating mechanism, such for example as that shown in my earlier Patent No. 1,002,818, the lower portions of the resilient band will engage the shoe first and the area of engagement will spread progressively toward the upper edge to wrap the stock toward the edge of the last and then hold it clamped against the side of the last throughout the height of the band. By this invention, therefore, the band closing mechanism operates through the resilient side walls of the peculiarly formed band to apply clamping pressure to the upper materials through the lower portions as well as through the upper portions of the band as contemplated by the generic claims of Patent No. 1,030,519, granted June 25, 1912 on application of Albert A. MacLeod.

The heel band through its chain 86, Fig. 10, is attached at its rear closed end to a block 88 which is dovetailed upon a head 89 for sliding adjustment transversely of the machine. The block 88 has a lateral arm pivotally connected to the front end of a lever 90 of the third class that is fulcrumed at 91 and has threaded engagement with an adjusting rod 92 carrying a hand wheel 94. The head 89 has threaded engagement with a rod 95 having a hand wheel 96 by which the band can be adjusted lengthwise, both adjustments being independent of the wipers.

The heel carriage latch 6 is automatically lifted from the catch 7 by plunger 8 and swinging bar 9 as one of the first steps in the unjacking operation which is more fully explained in said earlier Patent No. 1,018,477, and the carriage is then retracted by a spring 11, Fig. 2. The last pin 5 is carried by a toothed slide 112, Fig. 2, through which the shoe is drawn back into the heel band by a hand wheel 13 having a pinion 14 engaging the slide, said slide compressing a spring 15. The inner face of the hand wheel rim is toothed as in Figs. 11 and 12 for engagement by a swinging latch 16 actuated by a spring 17 and having a hand operating lever 18.

Figure 13:
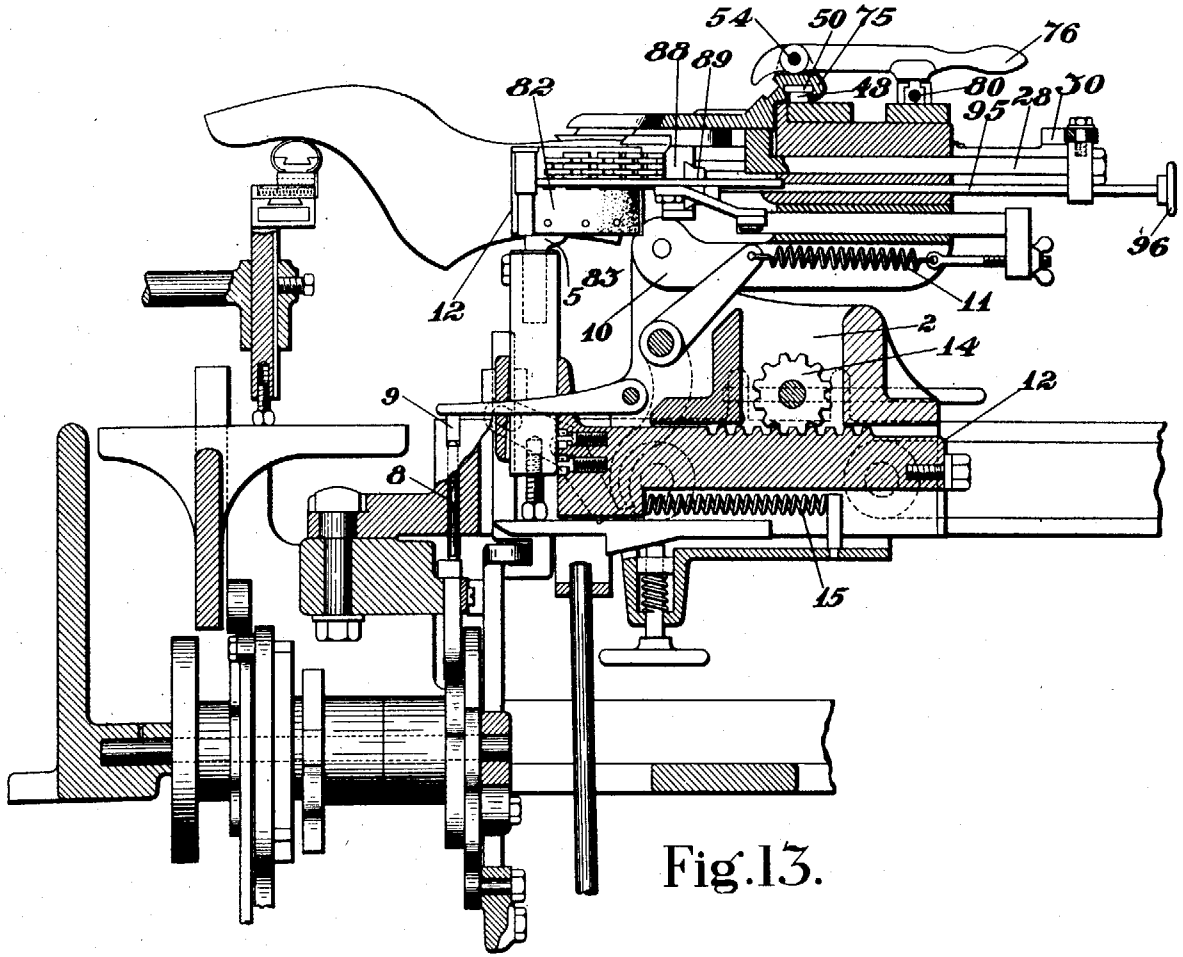
Fig. 13 is a longitudinal section.

Referring now to Figs. 11 and 12, the free end of bar 9 is connected by a link with an arm of a rockshaft 100 the rear arm 102 of which carries a rearwardly projecting finger 104 having a pointed end. The latch 16 has a notch in its lower edge within which the finger stands during the heel seat lasting. When the unjacking operation occurs the parts are timed to lift the latch 6 and, by the time the spring 11 begins to retract the lasting head, to turn the rockshaft 100 and withdraw the latch 16 from the hand wheel 13, whereupon spring 15 acts to hold the heel pin slide and the shoe forward while spring 11 is drawing the lasting head 10 with the wipers and heel band away from the shoe. During this time the toe rest, Fig. 13, is being lowered by the unjacking mechanism. The pin is long enough to hold the latch 16 out of contact with the hand wheel as long as it is necessary for the lasting head to have movement relative to the last pin slide for delaying the retraction of the last and then to permit reëngagement of the latch with the wheel rim whereby the shoe is caused to be drawn off the toe rest after the rest has been lowered. Alternatively the latch 16 may be held away from the hand wheel during the entire backward movement of the lasting head and to this end the latch has a depending pin 106 which is carried and held by the finger 104 to the inner side of a guide-bar 108 that is fastened to the side of the frame. When the latch slides backwardly beyond the end of the finger the pin catches against the inner side of the guide-bar which may have a notch 110 at its rear end to let the finger out again.

Figure 7:
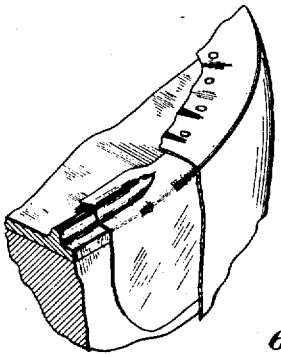
Fig. 7 shows the result of the action of a stiffener end shaper on a shoe.

In using the machine the wipers are set by lever 76 for a right or left shoe, being adjusted more or less for the style of the last by the threaded rod 80, and the end sections and shank shapers are also correspondingly adjusted for the same last by the slide plate 50 and threaded rod 34. The shoe is then jacked as usual and the wipers closed by levers 30 to lay the upper over the heel seat. In so doing the rear section 20 is advanced and turned; the side section 35 is closed in substantially a right line sweep transversely of the last, guided by slot 38 which prevents any advance movement of this section; the end section 40 is carried inwardly, without advancing, by section 35 and is also turned backwardly toward the end of the heel by its cam slot 44, according to the adjustment of bar 45; the stiffener end shaper 60 is advanced into early engagement with the stock, pressing it against the base of the innersole lip and then yielding relatively to end section 40 while it accompanies that section in turning about pivot 42 to rub the stock edgewise of the shaper. The operator usually backs off the wipers partially to uncover the tacking line while he is inserting the tacks, but the shaper 60 is yieldingly held to its work continuously and simply gets an edgewise rubbing movement at such times. The wipers are usually advanced again over the tacks and the shoe raised by a treadle against the wipers to iron down or compress the heel seat while the operator is lasting the toe. The stiffener end shaper preferably has a thin edge to make its creasing action more effective but it is covered by the wiper as in Fig. 4 when the shoe is raised and is thereby prevented from springing. It is to be noted that the operating mechanism gives to the shaper 60 a yielding end pressure, an edgewise rub toward the heel end, a slight reverse rub when the wipers are partially backed off, a similar return, and finally an edgewise rub having a component of movement longitudinally forward of the shoe after the compression which is incident to the raising of the jack. This effectively shapes the stock as shown in Fig. 7. When the heel has been lasted and tacked the wipers may be advanced over the tacking line and the heel raised to leave the stock under compression against the lower face of the wiper sections and the shaper 60 while the toe is being lasted, after which the shoe is unjacked by depressing the unjacking lever, as in said earlier Patent No. 1,018,477. When this is done the hand wheel 13 is unlocked in the described time relation to the other unjacking movements to delay the retraction of the shoe until after the toe rest has descended far enough to allow the toe to pull off from it easily.

The heel band and its adjusting mechanism are not claimed in this application but form the subject-matter of United States Letters Patent No. 1,188,617, granted June 27, 1916 on a divisional application, Serial No. 38,913, filed July 9, 1915.

Having explained the nature of this invention and described a preferred construction embodying the same I claim as new and desire to secure by Letters Patent of the United States:—

1. In a lasting machine the combination with an end embracing band, of end embracing wipers which are operatively connected together, and means for effecting lateral angular adjustment of the band and wipers relatively about a definite substantially vertical axis.

2. In a lasting machine the combination with an end embracing band, of end embracing wipers which are operatively connected for angular adjustment laterally together in the same direction and relatively to the band, right and left stops for limiting such adjustment equally in opposite directions and means for adjusting said stops simultaneously.

3. In a lasting machine the combination with an end embracing band, of end embracing wipers which are operatively connected together, means for effecting lateral angular adjustment of the band and wipers relatively about a substantially vertical axis, and a locking latch arranged to secure the parts in definite right or left relative adjustments and also to fasten them in central relative position.

4. In a lasting machine the combination with an end embracing band, of end embracing wipers which are operatively connected together and are guided for angular adjustment in the plane of their acting faces relatively to the band, the lever 76 for effecting such adjustment, the stops 78, the adjusting and supporting rod 80 on which the stops are mounted and the spring 77 arranged to hold the lever in locking relation to one or another or both of said stops as described.

5. In a lasting machine the combination with a heel band having a depth to extend from the tread face for a substantial distance down the side faces of the heel of an inverted last and constructed and arranged to embrace the heel portion of the last and locate the heel end of the last laterally in the machine; of heel wipers and operating mechanism to cause the wipers to embrace the heel and wipe the upper materials over the heel seat face of the last; and means for relatively positioning the heel band and the heel wipers laterally about a substantially vertical axis including devices to determine definite angular positions for right and left lasts at either side of a median position for straight lasts.

6. In a lasting machine the combination with a heel band having a depth to extend from the tread face for a substantial distance down the side faces of the heeel of an inverted last and constructed and arranged to embrace the heel portion of the last and locate the heel end of the last laterally in the machine; of heel wipers and operating mechanism to cause the wipers to embrace the heel and wipe the upper materials over the heel seat face of the last; and means to effect a wiper adjustment relatively to the band to adapt the wipers to the contour of the bottom face of the last positioned laterally by the band embracing the last substantially as described.

7. In a lasting machine the combination with a heel band having a depth to extend from the tread face for a substantial distance down the side faces of the heel of an inverted last and constructed and arranged to embrace the heel portion of the last and locate the heel end of the last laterally in the machine; of heel wipers and operating mechanism to cause the wipers to embrace the heel and wipe the upper materials over the heel seat face of the last, said wipers being adjustable together in the same direction angularly relatively to the band to adapt them to differences in contour between the portions of the last which the band and the wipers embrace.

8. In an end lasting machine heel embracing wipers each comprising a heel end wiper section mounted to advance and turn inwardly and a heel side wiper section which has inward movement without any advancing movement.

9. In an end lasting machine heel embracing wipers each comprising a heel end wiper section, a heel side wiper section and connected operating means for actuating the end sections inwardly and forwardly and actuating the side sections inwardly without forward movement.

10. In a lasting machine the combination with operating mechanism, of wiping means adapted to embrace the heel portion of a shoe and constructed and arranged relative to said operating mechanism to wipe forwardly over the rear end portion of the heel, inwardly with less forward movement over the sides of the heel and inwardly without forward movement over the front portions of the heel.

11. In a lasting machine the combination with operating mechanism, of wiping means adapted to embrace the heel portion of a shoe and constructed and arranged relative to said operating mechanism to wipe inwardly and forwardly over the rear end portion of the heel and simultaneously to wipe inwardly and backwardly over the front portions of the heel.

12. In an end lasting machine heel embracing wipers each comprising a heel end wiper section mounted to advance and turn inwardly and another wiper section which has inward and backward movement simultaneously with the movement of the end section, the acting edges of said sections being located in the same horizontal plane.

13. In an end lasting machine heel embracing wipers each comprising end sections which are advanced and turned inwardly and side sections which are connected to the end sections to receive inward movement therefrom and are restrained from advancing movement.

14. In an end lasting machine heel embracing wipers each comprising an end section having the thickened acting edge portion and the thin side portion and the side wiper section mounted on the thin portion and having an acting edge in continuation of that of the end section substantially as described, and means for actuating said two sections in different paths.

15. In an end lasting machine heel embracing wipers each comprising a heel end wiper section, having a curved acting edge and a thin lateral extension provided with slots, a side wiper section mounted under said thin extension and having a stud pivoted therein with a foot block located in one of the slots, a cover plate having a slot angular to the last-mentioned slot and into which the stud projects, and means operatively connected with the heel end section for advancing and turning it and causing the side section to be turned about the axis of the stud.

16. In an end lasting machine heel embracing wipers each comprising a heel end wiper section, a plurality of side sections and guiding and operating mechanism arranged to actuate adjacent side sections respectively, one inwardly and forwardly and the other inwardly and rearwardly.

17. In an end lasting machine heel embracing wipers each comprising a heel end section, a heel side section, and a heel seat section, and connected means for actuating said sections in different paths including means for directing movement of the heel side section backwardly and inwardly over the shoe bottom.

18. In an end lasting machine, heel embracing wipers each comprising a heel side section and a heel seat section having pivotal movement relatively to the front end of the side section and connected means for actuating the side section inwardly and actuating the seat section inwardly and rearwardly.

19. In an end lasting machine, heel embracing wipers each comprising a heel side section and a heel seat section pivoted thereto, means for adjusting the normal angular relation of said sections into different operative positions, and means for actuating the wipers.

20. In an end lasting machine the combination with wiper operating mechanism, of heel embracing wipers comprising means to wipe the upper over the rear end portions of the heel and forwardly extending members adjustably connected with said end wiping means at each side of the heel, and means to maintain said members in different operative relations to said end wiping means.

21. In an end lasting machine the combination with wiper operating mechanism, of heel embracing wipers comprising means to wipe the upper over the rear end portions of the heel, and forwardly extending members pivotally connected with said end wiping means at each side of the shoe and adjustable about their pivotal connections to adapt them for the greater incurve at the inner side of the heel than at the outer side of the heel of right and left crooked lasts.

22. In an end lasting machine the combination with wiper operating mechanism, of heel embracing wipers comprising wiping means extending forwardly along the sides of the heel, and end sections jointed thereto and adjustable thereon independently of the action of the operating mechanism.

23. In an end lasting machine, heel embracing wipers each comprising a heel side section and a heel seat section pivoted thereto, means for adjusting the normal angular relation of said sections, and actuating means for relatively moving the wipers to effect the lasting operation.

24. In an end lasting machine, heel embracing wipers each comprising a heel side section and a front end section connected therewith to permit angular turning movement in the plane of said sections, means for holding said sections in different angular relations, and operating means for relatively moving said wipers to effect the lasting operation.

25. In an end lasting machine, heel embracing wipers each comprising a heel side section and a heel seat section connected therewith to permit angular turning movement in the plane of said wiper sections, means for adjusting the normal angular relation of said sections and actuating mechanism therefor having provision for accelerating the movement of the seat section while the side section is being moved.

26. In an end lasting machine, end embracing wipers each comprising a rear section and a side section, operating means for imparting to the rear section an advancing and a laterally inward movement to close over the curved end of the shoe and for imparting to the side section an inward movement without advancing.

27. In an end lasting machine, end embracing wipers each comprising a rear section and a side section, operating means for imparting to the rear section an advancing and a laterally inward movement to close over the curved end of the shoe, connections from the rear section to actuate the side section and means to modify the direction of movement of the side section and cause it to differ from that of the rear section.

28. In an end lasting machine, end embracing wipers comprising means to lay the upper over the rear and side portions of a heel, and end sections; mechanism for imparting operative movements to the overlaying means, connections from said means to operate the end sections, and means to modify the direction of movement of the end sections and cause their movement to differ from that of the first mentioned overlaying means.

29. In an end lasting machine, end embracing wipers each comprising a rear section and a side section, operating means for imparting to the rear section an advancing and a laterally inward movement to close over the curved end of the shoe, connections from the rear section compelling the side section to partake of the inward movement of the rear section and other means controlling advancing movement of the side section.

30. In an end lasting machine, end embracing wipers each comprising a rear section and a side section, operating means for imparting to the rear section an advancing and a laterally inward movement to close over the curved end of the shoe, a sliding connection between the sections arranged to carry the side section inwardly with the rear section, a cover, and a slot and pin connection between the cover and side section for controlling advancing movement of the side section.

31. In a heel lasting machine end embracing wipers, each comprising a rear section, a side section and an end section, means for advancing the rear section and turning it inwardly to close over the curved end of the heel seat, connections therefrom to move inwardly the side and end sections and means to restrain the side and end sections from partaking of the advance of the rear section.

32. In a heel lasting machine, end embracing wipers, each comprising a rear section, a side section and an end section, and operating means for advancing and simultaneously turning inwardly the rear sections to close over the curved rear end of the last, and for closing inwardly without advancing to a like extent the side and end sections of the wipers.

33. In a heel lasting machine, end embracing wipers, each comprising a rear section, a side section and an end section, and operating means for advancing and simultaneously turning inwardly the rear sections to close over the curved rear end of the last, said operating means acting through the rear section to close inwardly the side and end sections, and other means for controlling advancing movement of the side and end sections.

34. In a lasting machine, end embracing wipers each comprising a rear section, a side section with relation to which the rear section can slide longitudinally of the shoe, and operating means for turning inwardly and forwardly sliding the rear section and turning inwardly the side section.

35. In a lasting machine, end embracing wipers each comprising a rear section, a side section with relation to which the rear section can slide longitudinally of the shoe, and operating means for turning inwardly and forwardly sliding the rear section and moving inwardly the side section; combined with means for controlling the direction of the inward movement of the side section independently of the rear section.

36. In a lasting machine, end embracing wipers each comprising a rear section, a side section with relation to which the rear section can slide longitudinally of the shoe, and an end section carried by the side section and having an independent movement thereon, and means for imparting appropriately different movements to the several sections, for the purpose described.

37. In an end lasting machine, heel embracing wipers each comprising a rear section, means for actuating it forwardly and inwardly over the curved rear end of the heel, and a front end section relatively to which the forward movement of the rear section takes place and which partakes of the inward movement of the rear section.

38. In an end lasting machine, heel embracing wipers each comprising a rear section, means for actuating it forwardly and inwardly over the curved rear end of the heel, and a front end section relatively to which the forward movement of the rear section takes place and which partakes of the inward movement of the rear section, and means for imparting additional inward movement to the front end section.

39. In an end lasting machine, heel embracing wipers each comprising a rear section, means for actuating it forwardly and inwardly over the curved rear end of the heel, and a front end section relatively to which the forward movement of the rear section takes place and which partakes of the inward movement of the rear section, and means for imparting to the front end section an additional inward movement having a backward component toward the rear end of the heel.

40. In an end lasting machine, heel embracing wipers each comprising a rear section, means for actuating it forwardly and inwardly over the curved rear end of the heel, and a front end section relatively to which the forward movement of the rear section takes place and which partakes of the inward movement of the rear section, and means which is adjustable to impart to the front end section a variable movement inwardly while the rear section is being advanced and moved inwardly.

41. In an end lasting machine, heel embracing wipers each comprising a rear section, a front end section and connected means for actuating the rear section forwardly and inwardly over the curved rear end of the heel and for actuating the front end section inwardly and backwardly in a curve substantially perpendicular to the incurve on the side of a shoe near the heel breast and rear portion of the shank.

42. In an end lasting machine, heel embracing wipers each comprising a rear section, means for actuating it forwardly and inwardly over the curved rear end of the heel, and a front end section relatively to which the forward movement of the rear section takes place and which partakes of the inward movement of the rear section; and means for adjusting the front end sections of the wipers relatively to the rear sections.

43. In an end lasting machine, heel embracing wipers each comprising a rear section, means for moving it forwardly and inwardly over the curved rear end of the heel, and a front end section which partakes of the inward movement of the rear section, and means permitting and maintaining adjustment of the front end sections of the wipers relatively to the rear sections.

44. In an end lasting machine, heel embracing wipers each comprising a rear section, means for actuating it forwardly and inwardly over the curved rear end of the heel, and a front end section relatively to which the forward movement of the rear section takes place and which partakes of the inward movement of the rear section; and means for adjusting the front end sections of the wipers together toward the left or toward the right for right and left crooked lasts.

45. In an end lasting machine, heel embracing wipers each comprising a rear section, means for actuating it forwardly and inwardly over the curved rear end of the heel, and a front end section relatively to which the forward movement of the rear section takes place and which partakes of the inward movement of the rear section; means for adjusting the front end sections of the wipers together toward the left or toward the right for right and left crooked lasts and also means for adjusting said front end sections relatively for differences in degrees of crookedness in lasts.

46. In an end lasting machine, heel embracing wipers each comprising a rear section, means for actuating it forwardly and inwardly over the curved rear end of the heel, and a front end section which partakes of the inward movement of the rear section; and means for adjusting said front end sections relatively to each other and to the rear sections for differences in degrees of crookedness in lasts.

47. In a heel seat lasting machine, heel seat lasting wipers, and heel stiffener end shapers carried by the wipers and receiving automatically during the operation of the wipers a stiffener end shaping movement additional to the movement of the wipers.

48. In a heel seat lasting machine, heel seat lasting wipers, and heel stiffener end shapers carried by the wipers, means for advancing and closing the wipers to wipe the upper over the end and sides of the heel into lasted position upon the heel seat of the shoe, and operating connections through which the stiffener end shapers are caused to partake of the closing movement of the wipers but not of the advancing movement.

49. In a heel seat lasting machine, heel seat lasting wipers, and heel stiffener end shapers carried by the wipers, means for advancing and closing the wipers to wipe the upper over the end and sides of the heel into lasted position upon the heel seat of the shoe, and operating connections through which the stiffener end shapers are caused to partake of the closing movement of the wipers and are simultaneously moved reversely to the direction of advancing movement of the wipers.

50. In a heel seat lasting machine, heel seat lasting wipers, and heel stiffener end shapers carried by the wipers, means for operating the wipers to do their work, and means to cause the shapers to close against the work and to rub the shoe backwardly for creasing the stock into the angle between the feather and the lip or rib of a welt innersole while the wipers are operating.

51. In a heel seat lasting machine, heel seat lasting wipers, and heel stiffener end shapers carried by the wipers, and normally projecting yieldingly in advance thereof to engage the work ahead of the wipers and receive a movement lengthwise of the shoe as they yield backwardly while the wipers advance and close, and means for advancing and closing the wipers.

52. In a heel seat lasting machine, heel seat lasting wipers, and heel stiffener end shapers set into the lower face of the wipers and normally projecting inwardly therefrom yieldingly so that they engage the stock first when the wipers are closed.

53. In a heel seat lasting machine, heel seat lasting wipers, and heel stiffener end shapers set into the lower face of the wipers and normally projecting inwardly therefrom yieldingly so that in partaking of the turning movement of the wipers they rub edgewise and crease the stock with yielding pressure against the base of the innersole lip, and means for advancing and turning the wipers.

54. In a heel seat lasting machine, heel seat lasting wipers, and heel stiffener end shapers set into the lower face of the wipers and normally projecting inwardly therefrom yieldingly and adapted to yield back of the wiper's edge to press the stock against the base of the lip of the innersole while the overlying portion of the wiper folds the free edge of the stock over the lip.

55. In a heel seat lasting machine, wipers, operating means therefor, stiffener end shapers movable about pivots near the front ends of the wipers, and coöperating cam slots and rolls operatively connected with said operating means to impart to the shapers a movement about their pivots.

56. In a heel seat lasting machine, wipers, operating means therefor, stiffener end shapers movable about pivots near the front ends of the wipers, coöperating cam slots and rolls operatively connected with said means to impart to the shapers a movement about their pivots additional to the movement of the portions of the wipers upon which they are pivoted, and adjustable means for varying the said additional movement.

57. In a lasting machine, the combination of means constructed and arranged to support the heel portion of a shoe, a rest to support the toe of a shoe, means for relatively moving the supported shoe and the toe rest to relieve the pressure of the rest against said toe rest and heel supporting means being relatively movable lengthwise of the shoe to open the machine for the removal of the shoe, and means timed to prevent such relative lengthwise movement of the shoe and toe rest to open the machine until after the supporting pressure of the toe rest against the shoe toe has been relieved.

58. In a lasting machine, the combination of means constructed and arranged to support the heel portion of a shoe, a rest to support the toe of a shoe, said toe rest and heel supporting means being relatively movable to open the machine for the removal of the shoe, and means for effecting said relative movement to open the machine constructed and arranged to relieve the supporting pressure of the toe rest against the toe of the shoe before effecting relative movement of the shoe and toe rest to open the machine.

59. In a lasting machine, the combination of a rest to support the toe of a shoe, means arranged to support the heel portion of a shoe movable rearwardly away from the toe rest with a supported shoe to open the machine for the removal of the shoe, means for relatively moving the supported shoe and the toe rest to relieve the pressure of said rest against the shoe toe, and means timed to prevent rearward movement of the heel supporting means and shoe until after the supporting pressure of the toe rest against the toe of the shoe has been relieved.

60. In a lasting machine, the combination of a rest to support the toe of a shoe, a heel lasting head movable rearwardly away from the toe rest to open the machine for the removal of a lasted shoe, means for relatively moving the supported shoe and the toe rest to relieve the pressure of said rest against the shoe toe, a last carrier supported in the lasting head, and unjacking means timed to delay rearward movement of the last carrier until after the supporting pressure of the toe rest against the shoe toe has been relieved.

61. In a lasting machine, the combination of a rest to support the toe of a shoe, a heel lasting head movable rearwardly away from the toe rest with the shoe to open the machine for the removal of a lasted shoe, means for relatively moving the supported shoe and the toe rest to relieve the pressure of said rest against the shoe toe, and means timed to prevent the shoe from being moved rearwardly by the heel lasting head until after the supporting pressure of the toe rest against the shoe toe has been relieved.

62. In a lasting machine, the combination of a toe rest, a heel lasting head movable rearwardly away from the toe rest to open the machine for the removal of a lasted shoe, a last carrier, means for locking the last carrier to the head, means for effecting movement of the heel lasting head to open the machine and mechanism organized to render said last-named means effective and also to unlock the last carrier from the head before the head is retracted.

63. In a lasting machine, the combination of a retractable heel lasting head, means for locking it against retraction, a last carrier, means for locking it to the head, and connected means for unlocking the head and the carrier in timed relation.

64. In a lasting machine, the combination of means constructed and arranged to support the heel portion of a shoe, a rest to support the toe of a shoe, said toe rest and heel supporting means being relatively movable to open the machine for the removal of the shoe, means constructed and arranged for relatively moving the heel supporting means and toe rest in such timed relation as to prevent scraping of the toe of the shoe on the toe rest.

65. In a lasting machine, the combination of means to support the heel portion of a shoe arranged for movement with a shoe in reverse directions to and from shoe lasting position, a rest movable to and from supporting engagement with the toe of a shoe positioned for lasting, and mechanism operative to move the toe rest and said supporting means from their respective lasting positions in such timed relation as to relieve the pressure of the toe rest against the shoe toe before the shoe is retracted from lasting position.

66. In a lasting machine, the combination of means to support the heel portion of a shoe arranged for movement with a shoe in reverse directions lengthwise of a supported shoe to and from a working position, a rest movable in directions substantially perpendicular to the plane of a supported shoe bottom to and from supporting engagement with the toe of a shoe in said working position, and mechanism operative automatically to move the toe rest and said supporting means from their respective working positions in timed relation to relieve the pressure of the toe rest against the shoe toe before the shoe is moved from working position.

67. In a lasting machine, the combination of a last pin, a toe rest movable in directions substantially perpendicular to the plane of a supported shoe bottom into and away from engagement with the toe of a shoe whose last is supported on said pin, a heel lasting head in which the last pin is supported and which is movable lengthwise of the shoe toward the toe rest to lasting position, and means for locking the head in lasting position and for automatically retracting the head when said locking means is released, of unjacking means for relatively moving the toe rest and last pin in such timed relation as to prevent the scraping of the toe of a shoe on the toe rest as the last pin and toe rest are relatively moved to open the machine for the removal of a lasted shoe.

68. In a lasting machine, the combination with a last pin, a rest movable into and away from supporting engagement with the toe of a shoe whose last is supported on said pin, a heel lasting head movable toward the toe rest to lasting position and in which head the last pin is supported, and means for locking the head in lasted position and for automatically retracting the head when the locking means is released, of unjacking means for moving the toe rest away from the shoe toe and for releasing the locking means for said head in such timed relation that the toe rest is moved away from the shoe toe before the last pin and shoe are withdrawn relatively to the toe rest by said automatic retraction of the unlocked heel head.

69. In a lasting machine, the combination with a last pin, a rest movable into and away from supporting engagement with the toe of a shoe whose last is supported on said pin, and a heel lasting head in which the last pin is supported and which is movable toward the toe rest to lasting position and away from the toe rest to open the machine for taking out a lasted shoe, of unjacking mechanism for moving the toe rest away from the toe of the shoe and for moving the heel lasting head and last pin with the supported last and shoe away from the toe rest in such timed relation as to prevent movement of the shoe away from the toe rest until the supporting pressure of the toe rest against the shoe toe has been relieved.

70. In a lasting machine, the combination with a heel lasting head arranged to support a last and shoe, a toe rest movable into and away from engagement with the toe of a shoe supported by said head, said lasting head being movable toward the toe rest to lasting position and away from the toe rest to open the machine for taking out a lasted shoe, and means for locking the head in lasting position and for automatically retracting the head when the locking means is released, of unjacking means for moving the toe rest away from the shoe toe and for releasing the locking means for said head in such timed relation that the supporting pressure of the toe rest against the shoe toe is relieved before the lasting head is moved away from the toe rest to open the machine.

71. In a lasting machine, the combination with a lasting pin arranged for movement to and from a lasting position, a rest movable into and away from supporting engagement with the toe of a shoe whose last is supported on said pin, a heel lasting head in which the last pin is supported for movement away from said toe rest against yielding resistance, means for locking the last pin in adjusted position in the lasting head, said lasting head being movable to and away from a lasting position, and means for locking the lasting head in said lasting position and for automatically retracting the head when said locking means is released, of unjacking means for moving the toe rest away from the shoe toe and for unlocking said lasting head and last pin in such timed relation as to relieve the supporting pressure of the toe rest against the shoe toe before the shoe is drawn off the toe rest by the last pin.

72. In a lasting machine, the combination with a vertically movable toe rest, a last pin, a heel lasting head in which the last pin is supported for rearward movement against yielding resistance, means for locking the last pin in adjusted position in the lasting head, and means for locking the head in its forward position, of unjacking means for releasing the toe rest, the lasting head and the last pin, arranged to allow initial backward movement of the lasting head relatively to the last pin while the toe rest is descending to relieve the toe supporting pressure before the shoe is drawn off the rest by the last pin.

73. In a lasting machine, the combination with a toe rest, a heel lasting head having a heel band and wipers and movable rearwardly away from the toe rest to open the machine for taking out a lasted shoe, and a last carrier supported in the lasting head, of unjacking means arranged relatively to move a supported shoe and said toe rest to relieve the pressure of the rest against the shoe toe and timed to delay the retraction of the last carrier until after the toe supporting pressure of the toe rest has been relieved and then to free the shoe from the band and wipers.

74. In a lasting machine having heel seat lasting mechanism including a longitudinally movable head, a heel band and wipers carried therein, and means for locking the head in operative position, means for retracting it, a last carrier, means to actuate the last carrier to jack the shoe back into the heel band, a spring to move the carrier reversely and means to lock the last carrier to the head, combined with unjacking means arranged to unlock the lasting head and to unlock the last carrier from the head before it retracts the shoe.

75. In a lasting machine the combination with an automatically retractable heel lasting head, means for locking it, an automatically forwardly pressed last carrier in the head, and means for locking it to the head, of connected means movable for unlocking the head and the carrier in time relation to delay the retraction of the shoe until after the head has begun to move backwardly.

76. In a lasting machine the combination with a retractable heel lasting head, a track over which it travels, a last carrier, a ratchet faced hand wheel to retract the last carrier in the head, and a pawl carried on the head to lock the hand wheel, of a rail on the track to be engaged by the pawl to hold it free from the hand wheel during the retraction of the lasting head, and means to disengage the pawl from the hand wheel and cause it to become engaged with the rail.

77. In a lasting machine the combination with a movable heel lasting head, means for locking it, a last carrier, means including the toothed hand wheel 13 for retracting the last carrier relatively to the lasting head, and the pawl 16 for locking the hand wheel, of the rockshaft 100 arranged for operation automatically when the lasting head is unlocked and to withdraw the pawl 16 from the hand wheel.

78. In a lasting machine the combination with a movable heel lasting head, a support therefor, a last carrier, means for retracting the last carrier relatively to the head, and retaining means for holding the last carrier in its retracted position, of means for automatically freeing the retaining means from the last carrier in time relation to the movement of the head on the support, and means for maintaining the retaining means free during the travel in one direction of the head on its support and formed to allow it to act during travel in the other direction 79. In a lasting machine the combination with a movable heel lasting head, a last carrier, means for retracting the last carrier relatively to the lasting head, of means for locking the last carrier in its retracted position, of means operated in time relation with the movement of the lasting head for releasing the last carrier and means dependent upon the position of the lasting head for permitting reëngagement of the locking means with the last carrier.

80. In an end lasting machine, end embracing wipers each comprising a side section and an end section, and operating means for imparting to the end section a combined advancing and laterally inward movement to close over the more curved portion of the end of the shoe and for imparting simultaneously to the side section an inward movement with less forward movement than is imparted to the end section.

81. In a lasting machine, end embracing wipers each comprising a rear section, a side section with relation to which the rear section can slide longitudinally of the shoe, and operating means for turning inwardly and forwardly sliding the rear sections and for imparting the required lasting movements to the side section.

82. A machine of the class described having, in combination, end lasting wipers comprising coöperating lasting plates each having relatively movable heel end, side and shank members; and means for moving said members relatively during the closing of the wipers over the shoe bottom.

83. A machine of the class described having, in combination, end lasting wipers comprising coöperating plates each having a heel end member which advances and swings inwardly over the rear end and a corner of the heel, a side member which closes inwardly over the side of the heel, and a shank member which swings backwardly and inwardly.

84. A machine of the class described having, in combination, end lasting wipers comprising coöperating lasting plates including shank members which move rearwardly during the closing of the plates over the shoe bottom.

85. A machine of the class described having, in combination, end lasting wipers comprising coöperating lasting plates including end members which move toward one another during the closing of the plates over the shoe, and a side member relatively to which said end members are moved.

86. A machine of the class described, having, in combination, end lasting wipers comprising coöperating lasting plates each including a side member which has a movement inwardly over the shoe bottom without forwardly advancing movement, and a shank member movable with said side member and having an additional swinging movement backwardly.

87. A machine of the class described having, in combination, a wiper cam plate, operating means to advance and turn the cam plate, a wiper member rigid with said cam plate, a second wiper member connected to said cam plate for turning movement thereby, and means for restraining the second member from advancing movement with the cam plate.

88. A machine of the class described, having, in combination, end lasting wipers comprising a lasting plate, means for swinging it over the side of the heel of a last, a second lasting plate pivotally connected with the first-mentioned plate, and means for turning the second lasting plate about said pivot automatically during the closing movement of the first-mentioned plate.

89. A machine of the class described having, in combination, two wipers constructed and arranged to embrace the heel portion of a shoe, each of said wipers comprising relatively movable members connected together, and means for operating said members to wipe the upper over the ends and sides of a heel in directions substantially perpendicular to the edge portion of the heel at all points.

90. A machine of the class described having, in combination, two wipers constructed and arranged to embrace an end portion of a shoe and mounted for relative turning movement about an axis located substantially in the line in which their adjacent ends meet, one of said wipers being provided with a tongue located back of the wiping edges and curved in an arc about said axis and the other of said wipers having a recess shaped to receive said tongue and guide it during movement of the wipers about said axis.

91. A machine of the class described having, in combination, two wipers constructed and arranged to embrace an end portion of a shoe and mounted for relative turning movement about an axis located substantially in the line in which their adjacent ends meet, one of said wipers being provided with a tongue located back of the said axis and of less thickness than the wiper, and the other wiper having in one face a seat of proper proportions to receive and guide the tongue flush with the surface of the wipers.

92. A machine of the class described having, in combination, two wipers constructed and arranged to embrace an end portion of a shoe and mounted for relative turning movement about an axis located substantially at their meeting ends, said wipers being provided in one face with a guideway located at a distance back from said axis and curved about said axis, and a tongue fitted in said guideway and long enough to bridge the gap between the wipers in all of the relative positions which the wipers occupy during use.

In testimony whereof I have signed my name to this specification.

MATTHIAS BROCK.

Copies of this patent may be obtained for five cents each, by addressing the "Commissioner of Patents, Washington, D. C."